United States Patent Office 2,981,068
Patented Apr. 25, 1961

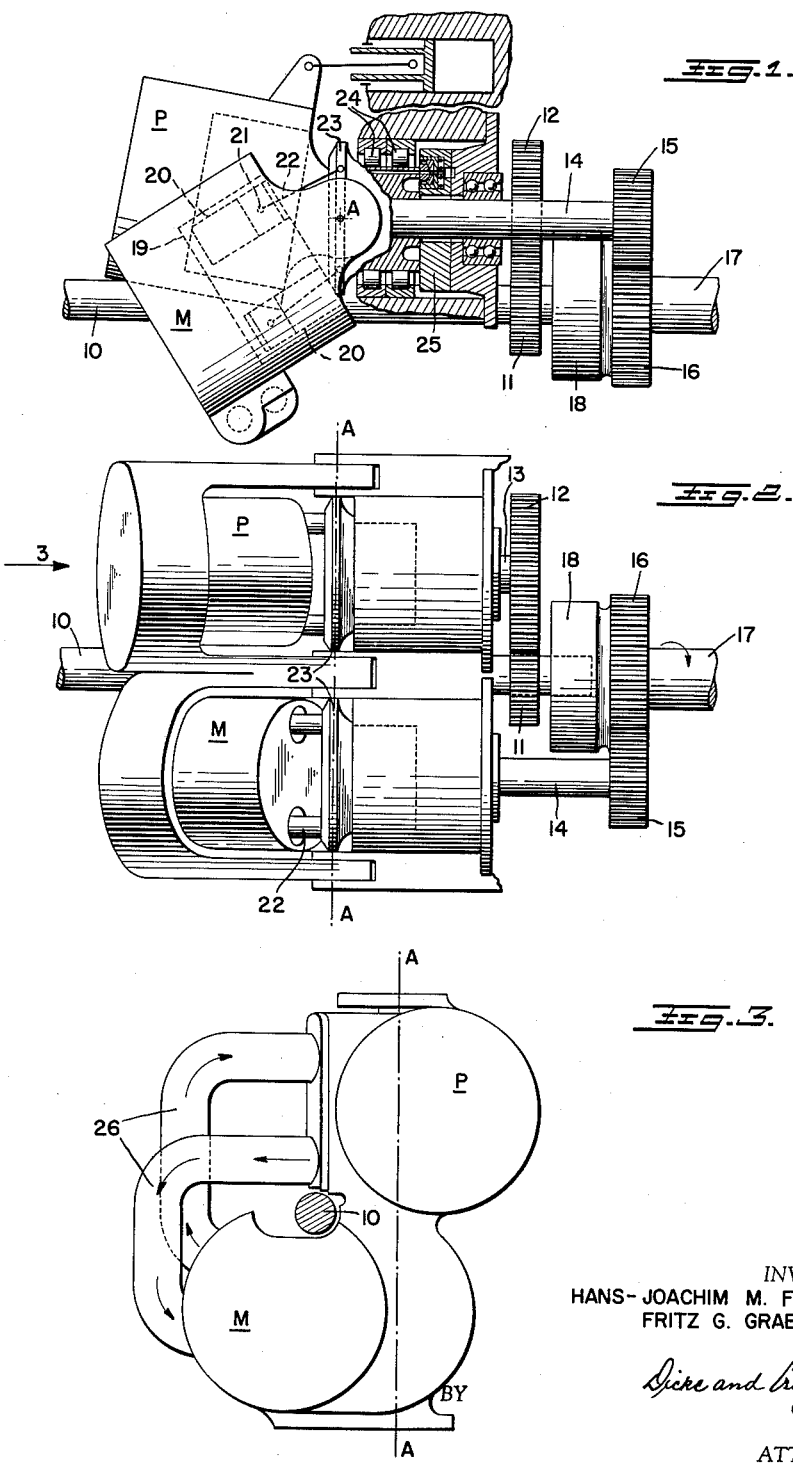

2,981,068

HYDROSTATIC TRANSMISSION WITH SLEWABLE PUMP AND MOTOR AGGREGATE

Hans-Joachim M. Foerster, Stuttgart-Bad Cannstatt, and Fritz G. Grabow, Stuttgart-Unterturkheim, Germany, assignors to Daimler-Benz Aktiengesellschaft, Stuttgart-Unterturkheim, Germany Filed Aug. 13, 1956, Ser. No. 616,670

Claims priority, application Germany Aug. 16, 1955

9 Claims. (Cl. 60—53)

(Filed under Rule 47(a) and 35 U.S.C. 116)

The present invention relates to a hydrostatic transmission in which the pump aggregate or unit as well as the motor aggregate or unit are arranged in a slewable or swingable manner in order to control the torque conversion or transmission ratio of the transmission.

The slewing or swinging movement of the aggregates or units thereby effects, for example, that the pistons arranged in the slewable aggregates or units and driven by appropriate control disks or swash plates carry out a controllable or adjustable piston stroke and thereby change the transmission ratio of the hydrostatic transmission.

The present invention aims above all at a simplification of such a hydrostatic transmission with respect to the construction thereof as well as also with respect to the operation and control thereof, and consists essentially in that the pump and motor aggregates or units are slewable in unison, especially in that the pump aggregate and motor aggregate are combined into a rigid slewable unitary construction. The pump and motor aggregates are thereby preferably arranged in V-shape, yet are also displaced with respect to each other in the axial direction of the common swinging or slewing axis thereof. The slewing or swinging movement of the unit which consists of the two aggregates preferably takes place in such a manner that when one of the two aggregates is adjusted to a greater inclination, the inclination of the other aggregate is thereby reduced.

The present invention eliminates the necessity for a separate adjustment of both aggregates in the swinging or slewing directions thereof. Simultaneously therewith, the lines leading from the pump aggregate to the motor aggregate and vice versa may be arranged within the housing unit without the necessity of any separate flexible lines. Together with a favorable arrangement of the hydraulic lines, such a construction enables the attainment of a transmission having a relatively slight constructional size, i.e., a transmission which requires relatively little space and has relatively little weight.

For purposes of obtaining a reverse speed, special shifting means may be provided for selectively interchanging the connection of the suction and pressure lines of the pump aggregate or motor aggregate with the remaining line system.

The driving and driven shafts are advantageously arranged perpendicular to the swinging axis of the pump and motor aggregates, whereby the pump shaft is drivingly connected by a pair of gear wheels with the drive shaft and the motor shaft by a pair of gear wheels with the driven shaft. The driving shaft and driven shaft may appropriately be connected with each other by means of a clutch which by-passes the hydrostatic transmission. As a result thereof, the overall efficiency of the drive is appropriately increased.

Accordingly, it is an object of the present invention to provide a hydrostatic transmission which is of compact design, requiring relatively little space, and, therefore, may also be made of reduced weight.

Another object of the present invention resides in the provision of a hydrostatic transmission which is simplified as regards the construction and control thereof.

Still another object of the present invention resides in a unitary construction of the pump and motor aggregate or unit of a hydrostatic transmission wherein the two aggregates are arranged in V-like manner and are displaced with respect to each other in the direction of the common slewing axis thereof.

Another object of the present invention is the provision of a hydrostatic transmission which obviates the need for separate flexible lines interconnecting the pump unit with the motor unit thereof, instead of accommodated within the unit itself.

A further object of the present invention is to provide a hydrostatic transmission in which both the pump aggregate and motor aggregate are slewable together as a unit.

These and other objects, features, and advantages of the present invention will become more obvious from the following description when taken in connection with the accompanying drawing which shows, for purposes of illustration only, one preferred embodiment in accordance with the present invention, and wherein:

Figure 1 is a side view of a transmission in accordance with the present invention partially in cross section taken along line 1—1 of Figure 2, Figure 2 is a plan view of the transmission illustrated in Figure 1, and Figure 3 is a front view of the transmission in accordance with the present invention as viewed in the direction of the arrow 3 of Figure 2.

Referring now to the drawing, wherein like reference numerals are used throughout the various views to designate like parts and more particularly to Figures 1 and 2 thereof, reference numeral 10 designates a drive shaft by means of which the hydrostatic transmission is driven. The drive shaft 10 itself may be driven, for example, by an internal combustion engine which serves as the driving engine of a motor vehicle. The drive or input shaft 10 drives the pump shaft 13 of the pump aggregate or unit P by means of a pair of meshing gear wheels 11 and 12. The motor aggregate or unit M which is hydraulically connected with the pump aggregate P in the usual manner in turn drives the motor shaft 14 which is drivingly connected over a pair of meshing gear wheels 15 and 16 with the driven or output shaft 17 arranged coaxially with respect to the driving shaft 10. The shafts 13 and 14 are disposed on the same side of a vertical plane containing a slewing axis A—A for the pump and motor units. A clutch 18 of any suitable construction is adapted to directly connect the driving shaft 10 with the driven shaft 17 in by-passing relationship with respect to the hydrostatic transmission.

The pump aggregate P and the motor aggregate M are combined into a common housing or casing unit which is slewable or swingable about the axis A—A by fluid pressure responsive means such as the cylinder and piston shown in Figure 1, the piston having a connecting rod connected to the casing unit as shown. Each of the two aggregates are constructed in principle in the same manner. Consequently, only one of the aggregates will be described briefly, especially as such aggregates are well known.

A plurality of pistons 21 are reciprocably arranged in the corresponding cylinders 20 of a rotating casing drum or cylinder 19, one of these rotating cylinders 19 being provided in each of the slewable but non-rotatable aggregates P and M.

The pistons 21 are connected by means of conventional connecting rods 22 with a driving disk 23, effectively constituting a swash plate, which, in turn, is drivingly connected with a corresponding one of the shaft 13 of the pump P or of the shaft 14 of the motor M, respectively. The shaft or the driving disk 23 of each unit is thereby supported in a radial bearing 24 and is axially supported in the direction of the pressure of the pistons 21 at a pressure disk 25.

The hydraulic connections between the cylinders 20 of the pump P and the cylinders 20 of the motor M may be controlled in principle in any usual conventional manner and, therefore, are not indicated in detail. Moreover, special shifting means may be provided in connecting lines 26 (Figure 3) which interconnect the pump unit with the motor unit in order to effect reverse speed and neutral of the transmission. For example, for purposes of attaining a reverse speed, means may be provided to reverse the connection at the pressure and suction side of the pump or of the motor.

While we have shown and described one preferred embodiment in accordance with the present invention, it is understood that the same is not limited thereto but is susceptible of many changes and modifications within the spirit of the present invention, and we intend to cover all such changes and modifications except as defined by the appended claims.

We claim:

1. A hydrostatic transmission comprising a driving shaft and a driven shaft, a pump unit and a motor unit, said pump unit comprising a structure including a first set of cylinders and pistons disposed in a first rotatable drum, said motor unit comprising a structure including a second set of cylinders and pistons disposed in a second rotatable drum, said structures being integrally joined and slewable about a common axis, said pistons of said pump and said motor units having variable stroke lengths, means for slewing said structures about said axis, a driving disk operatively connected to said first rotatable drum, a driven disk operatively connected to said second rotatable drum, a first shaft connected to said driving disk, a second shaft connected to said driven disk, the axis of said first rotatable drum being disposed at a first variable angle to the axis of said first shaft, the axis of said second rotatable drum being disposed at a second variable angle to the axis of said second shaft, the stroke lengths of the pistons of said first set of cylinders and pistons being determined by the extent of said first variable angle, and the stroke lengths of the pistons of said second set of cylinders and pistons being determined by the extent of said second variable angle, said angles being unequal and varying in accordance with the slewing of said integrally formed structures about said axis, gearing connecting said driving shaft and said first shaft, and gearing connecting said second shaft and said driven shaft, said common axis and said disk lying in a common plane transverse to said shafts.

2. A hydrostatic transmission with a pump unit and a motor unit, said units each comprising slewable means including a rotatable drum having cylinder and piston means therein, the slewable means of said units being movable about a common slewing axis, means combining the slewable means of said pump unit with the slewable means of said motor unit into a rigid unitary structure of essentially V-shape in which the slewable means of the said units are displaced with respect to each other in the axial direction of said slewing axis, pump shaft means, motor shaft means, the rotatable drum of said pump unit being operatively connected to said pump shaft means, the axis of the drum of the slewable means of said pump unit having a variable angle of inclination to the axis of said pump shaft means, the rotatable drum of said motor unit being operatively connected to said motor shaft means, the axis of the drum of the slewable means of said motor unit having a variable angle of inclination to the axis of said motor shaft means, and hydraulic lines connecting said pump unit and said motor unit for fluid actuation of said motor unit by said pump unit.

3. A hydrostatic transmission comprising a pump unit having slewable cylinder means including a rotatable drum, cylinder and piston means in said rotatable drum, a pump shaft disposed at a variable angle to the axis of said rotatable drum, means operatively connecting said pump shaft to said rotatable drum, a motor unit having slewable cylinder means including a rotatable drum, cylinder and piston means in said last-named rotatable drum, a motor shaft disposed at a variable angle to the axis of said last-named rotatable drum, means operatively connecting said motor shaft to said last-named rotatable drum, connecting means between the said cylinder means of said pump unit and the said cylinder means of said motor unit to enable common slewing movement of both said cylinder means about a common slewing axis and to vary each said variable angle, said pump shaft and said motor shaft being disposed on the same side of said slewing axis, both said cylinder means being combined into a rigid unit by said connecting means, and means formed at least in part by said rigid unit to hydraulically interconnect said pump unit and said motor unit.

4. A hydrostatic transmission, comprising pump shaft means, motor shaft means, a pump unit, a motor unit, each of said units comprising slewable means including a rotatable drum with at least one cylinder having a piston therein, the slewable means of said units being movable about a common slewing axis, said slewable means being displaced with respect to each other in the axial direction of said slewing axis, the axis of said drum of the slewable means of said pump unit and the axis of said pump shaft means forming a first variable angle, the axis of the drum of the slewable means of said motor unit and the axis of the motor shaft means forming a second variable angle, said transmission further comprising means operatively connecting said pump shaft means and the rotatable drum of said pump unit, said transmission further comprising means operatively connecting said motor shaft means and said rotatable drum of said motor unit, hydraulic lines connecting said pump unit and said motor unit for fluid actuation of said motor unit by said pump unit, and means operatively connected with the slewable means of said pump and motor units for pivoting said slewable means in unison and varying said first and second angles, and means for maintaining said drums in relative positions in which said first and second angles are unequal.

5. A hydrostatic transmission with a pump unit and an motor unit, said units each comprising slewable means including a rotatable drum having cylinder and piston means therein, the slewable means of said units being movable about a common slewing axis and being displaced relative to one another in the axial direction of said slewing axis, means integrally connecting the slewable means of said pump unit with the slewable means of said motor unit, pump shaft means and motor shaft means disposed on the same side of a plane transverse to said pump shaft means and said motor shaft means and containing said slewing axis, the rotatable drum of said pump unit being operatively connected to said pump shaft means, the axis of the drum of the slewable means of said pump unit having a variable angle of inclination to the axis of said pump shaft means, the rotatable drum of said motor unit being operatively connected to said motor shaft means, the axis of the drum of the slewable means of said motor unit having a variable angle of inclination to the axis of said motor shaft means, and hydraulic lines connecting said pump unit and said motor unit for fluid actuation of said motor unit by said pump unit.

6. A hydrostatic transmission according to claim 2, wherein said pump shaft means includes a pump shaft and said motor shaft means includes a motor shaft, further comprising input shaft means and output shaft means, and means for drivingly connecting said input shaft means with said pump shaft and said output shaft means with said motor shaft, said means for drivingly connecting being disposed on the same side of a vertical plane containing said slewing axis.

7. A hydrostatic transmission according to claim 6, further comprising clutch means for selectively coupling said input shaft means directly to said output shaft means in by-passing relationship to said hydrostatic transmission.

8. A hydrostatic transmission according to claim 7, wherein said input shaft means and said output shaft means are arranged coaxially, said clutch means being disposed intermediate said input shaft means and said output shaft means.

9. A hydrostatic transmission according to claim 3, further comprising coaxially arranged input and output shafts respectively operatively connected with said pump shaft and said motor shaft and spaced from said pump shaft and said motor shaft.

References Cited in the file of this patent

UNITED STATES PATENTS

| | | |
|---|---|---|
| 2,140,633 | Kocks | Dec. 20, 1938 |
| 2,192,539 | Condon | Mar. 5, 1940 |
| 2,220,636 | Bischof | Nov. 5, 1940 |
| 2,257,724 | Bennetch | Oct. 7, 1941 |
| 2,788,636 | Badalini | Apr. 16, 1957 |

FOREIGN PATENTS

| | | |
|---|---|---|
| 415,215 | Italy | Sept. 28, 1946 |
| 168,222 | Switzerland | June 16, 1934 |